(12) United States Patent
Muthukaruppan et al.

(10) Patent No.: US 10,320,656 B2
(45) Date of Patent: Jun. 11, 2019

(54) LOOP PREVENTION SYSTEM

(71) Applicant: Dell Products L.P., Round Rock, TX (US)

(72) Inventors: Senthil Nathan Muthukaruppan, Chennai (IN); Pugalendran Rajendran, Mettupalayam (IN); Shankara Ramamurthy, Chennai (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/496,673

(22) Filed: Apr. 25, 2017

(65) Prior Publication Data

US 2018/0309661 A1 Oct. 25, 2018

(51) Int. Cl.
*H04L 12/705* (2013.01)
(52) U.S. Cl.
CPC .................................. *H04L 45/18* (2013.01)
(58) Field of Classification Search
CPC .. H04L 41/12; H04L 41/5022; H04L 61/6022
See application file for complete search history.

(56) References Cited

U.S. PATENT DOCUMENTS

| 8,526,443 B2 * | 9/2013 | Baykal ................... H04L 12/42 370/395.53 |
| 9,264,347 B2 | 2/2016 | Anumala et al. |
| 9,379,945 B2 | 6/2016 | Janardhanan et al. |
| 2016/0234100 A1 | 8/2016 | Pathangi Narasimhan et al. |

* cited by examiner

*Primary Examiner* — Chandrahas B Patel
(74) *Attorney, Agent, or Firm* — Haynes and Boone, LLP

(57) ABSTRACT

A loop prevention system includes a first networking node that includes a first direct link that connects the first networking node to a loop configuration that includes plurality of networking node devices, and a second direct link that connects the first networking node to the loop configuration. The first networking node receives, through the first direct link, first network traffic that entered the loop configuration at a second networking node in the loop configuration. The first networking node then blocks the first network traffic through the second direct link based on a first forwarding rule for network traffic that enters the loop configuration at the second networking node and that is received by the first networking node device. The first networking node also receives, through the second direct link, second network traffic that entered the loop configuration at a third networking node in the loop configuration.

17 Claims, 14 Drawing Sheets

1200a

| SPT ROOT 1202 | MISSING LINK LIST 1204 | FORWARDING RULE 1206 |
|---|---|---|
| NETWORKING NODE DEVICE 2 206 | NONE | NO RULE |
| NETWORKING NODE DEVICE 3 208 | ICL(1,4) | Qualifier: Node ID 3 Action: Block the traffic toward ICL(1,4) |
| NETWORKING NODE DEVICE 4 210 | NONE | NO RULE |

| SPT ROOT 1202 | MISSING LINK LIST 1204 | FORWARDING RULE 1206 |
|---|---|---|
| NETWORKING NODE DEVICE 2 204 | NONE | NO RULE |
| NETWORKING NODE DEVICE 3 208 | NONE | NO RULE |
| NETWORKING NODE DEVICE 4 210 | ICL(2,3) | Qualifier: Node ID 4 Action: Block the traffic toward ICL(2,3) |

FIG. 12B

| SPT Rooted at Peer | MISSING_ICL_PORT_LIST | Forwarding Rule Required |
|---|---|---|
| NETWORKING NODE DEVICE 204 | ICL(3,4) | Qualifier: Node ID 1<br>Action: Block the traffic toward ICL(3,4) |
| NETWORKING NODE DEVICE 206 | ICL(3,4) | Qualifier: Node ID 2<br>Action: Block the traffic toward ICL(3,4) |
| NETWORKING NODE DEVICE 210 | ICL(3,2) | Qualifier: Node ID 4<br>Action: Block the traffic toward ICL(3,2) |

FIG. 12C

| SPT Rooted at Peer | MISSING_ICL_PORT_LIST | Forwarding Rule Required |
|---|---|---|
| NETWORKING NODE DEVICE 204 | ICL(4,3) | Qualifier: Node ID 1<br>Action: Block the traffic toward ICL(4,3) |
| NETWORKING NODE DEVICE 206 | ICL(4,3) | Qualifier: Node ID 2<br>Action: Block the traffic toward ICL(4,3) |
| NETWORKING NODE DEVICE 208 | ICL(4,1) | Qualifier: Node ID 3<br>Action: Block the traffic toward ICL(4,1) |

FIG. 12D

LOOP PREVENTION SYSTEM

BACKGROUND

The present disclosure relates generally to information handling systems, and more particularly to preventing logical loops between information handling systems in a physical loop configuration.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as switches are configured to aggregate multiple links to the switch using Link Aggregation Groups (LAGs) in order to, for example, increase throughput beyond what a single link can sustain, to provide redundancy in the event one or more links fail, and/or to provide a variety of other LAG benefits known in the art. In some situations, such switches may utilize multichassis LAGs that aggregate links connected to different networking nodes. For example, Virtual Link Trunking (VLT) is a proprietary aggregation protocol provided by the Assignee of the present disclosure that may be used on Top Of Rack (TOR) switches to aggregate links to different networking nodes connected to the TOR switch. In some situations, a VLT LAG may be provided on a TOR switch for respective direct links to a plurality of networking nodes ("directly-linked networking nodes"), and that plurality of directly-linked networking nodes may be connected together by inter-chassis links (ICLs) to each other, as well as to one or more networking nodes that do not have a direct link to the TOR switch that is a part of the VLT LAG ("indirectly-linked networking nodes").

The connection of directly-linked networking nodes and indirectly-linked networking nodes can raise a number of issues. For example, when an indirectly-linked networking node receives traffic that must be forwarded through the VLT LAG to the TOR switch, that indirectly-linked networking node must send that traffic through a directly-linked networking node in order to reach the VLT LAG. Thus, the traffic must be forwarded through every networking node between the indirectly-linked networking node and the directly-linked networking node (via the ICLs) until the traffic reaches the directly-linked networking node. However, when connecting the indirectly-linked networking nodes and directly-linked networking nodes with network cables to provide the ICLs and redundant connections, loop configurations may be formed. While physical loops may provide benefits such as redundancy, layer-2 logical loops resulting from those physical loops can consume the majority of network resources by rebroadcasting network traffic between the networking nodes in the loop configuration. The Spanning Tree Protocol (STP) is a layer 2 protocol that is often used to prevent network traffic from looping on networking nodes in a loop configuration. However, when the STP is utilized in a VLT system, some of the ICLs will be inactive unless a primary link fails. As such, networking nodes in loop configurations in a VLT system will include underutilized ICLs if the STP is used to prevent layer-2 logical loops.

Accordingly, it would be desirable to provide an improved loop prevention system.

SUMMARY

According to one embodiment, an information handling system (IHS), includes a communication system that is coupled to a plurality of networking node devices that are coupled together in a loop configuration, wherein the communication system includes a first direct link that connects the communication system to the loop configuration, and a second direct link that connects the communication system to the loop configuration; a processing system coupled to the communication system; and a memory system coupled to the processing system and including instruction that, when executed by the processing system, cause the processing system to provide a loop prevention engine that is configured to: receive, through the first direct link, first network traffic that entered the loop configuration at a first networking node device of the plurality of networking node devices in the loop configuration; block the first network traffic through the second direct link based on a first forwarding rule for network traffic that enters the loop configuration at the first networking node device and that is received by the communication system; and receive, through the second direct link, second network traffic that entered the loop configuration at a second networking node device of the plurality of networking node devices in the loop configuration.

BRIEF DESCRIPTION OF THE DRAWINGS

FIGS. 12A-12D are tables illustrating embodiments of forwarding rule tables for each networking node device in the loop configuration of FIG. 3.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
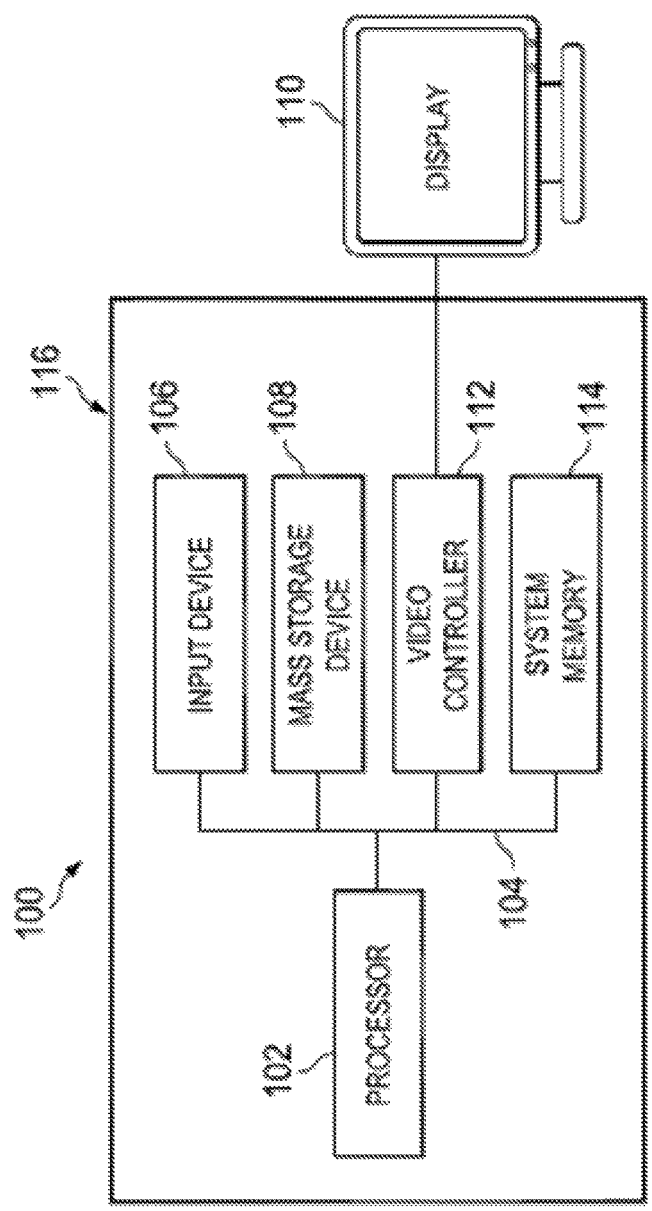
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
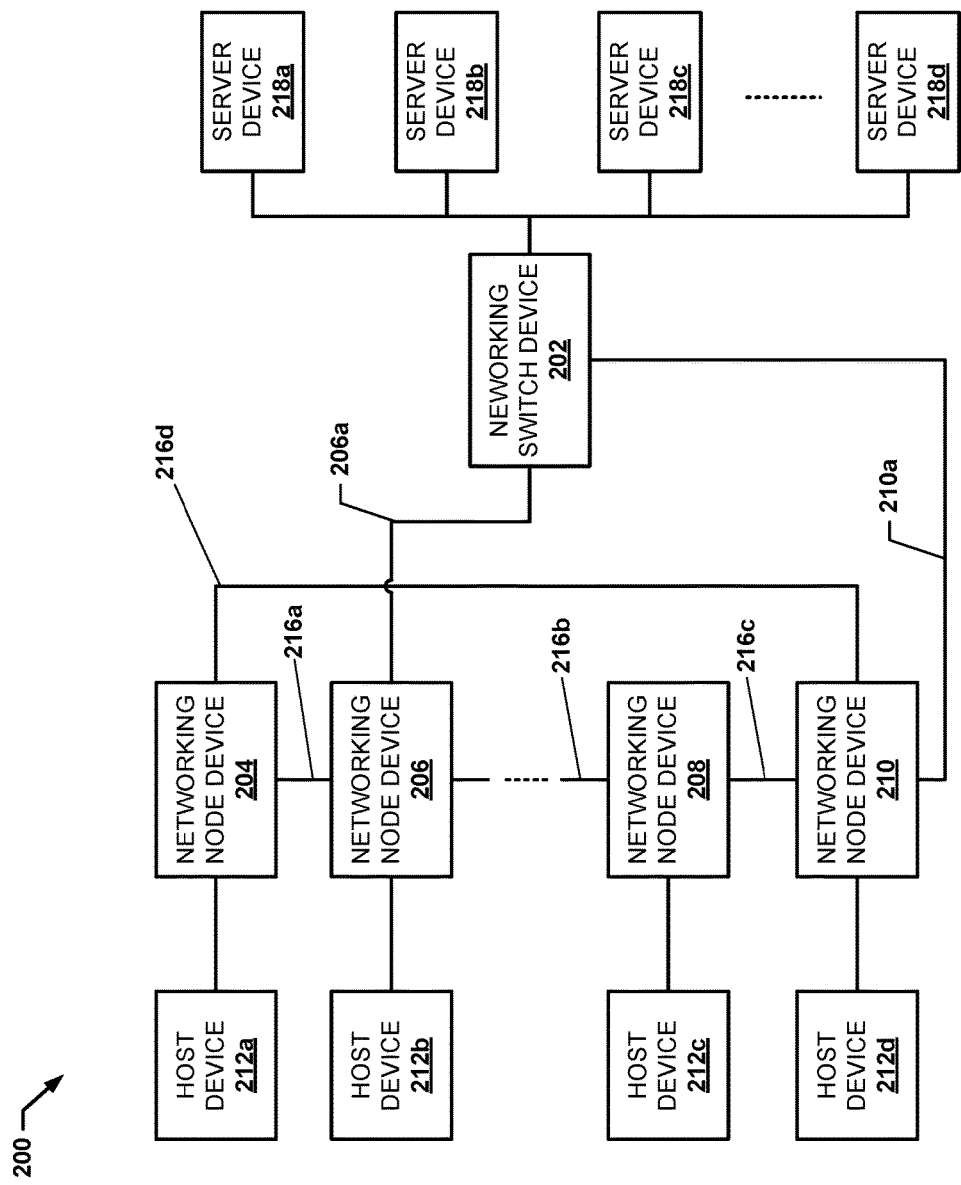
FIG. 2 is a schematic view illustrating an embodiment of a loop prevention system.

Referring now to FIG. 2, an embodiment of a loop prevention system 200 is illustrated. In the illustrated embodiment, the loop prevention system 200 includes a networking switch device 202 that may be the IHS 100 discussed above with reference to FIG. 1 and/or include some or all of the components of the IHS 100. In a specific example, the networking switch device 202 is a Top Of Rack (TOR) switch that may be provided on a rack in a datacenter, but one of skill in the art in possession of the present disclosure will recognize that a variety of other networking switch devices that are configured to provide a multi-chassis LAG (discussed below) will fall within the scope of the present disclosure. The networking switch device 202 is coupled to a plurality of networking node devices 204, 206, and up to 208 and 210. Any or all of the networking node devices 204-210 may be the IHS 100 discussed above with reference to FIG. 1 and/or include some or all of the components of the IHS 100. In some examples, the networking node devices 204-210 may include switches, routers, access points, and/or other networking node devices that are configured to receive and forward traffic. In the illustrated embodiment, a single networking switch device 202 has been provided for clarity of illustration and discussion, but one of skill in the art will recognize that multiple networking switch devices (e.g., TOR switches) may (and typically will) be provided in a network that utilizes the loop prevention systems of the present disclosure while remaining within its scope.

In the illustrated embodiment, the networking node device 206 is directly connected to the networking switch device 202 by a network connection 206a, and the networking node device 210 is directly connected to the networking switch device 202 by a network connection 210a. For example, the network connections 206a and 210a may be provided by a variety of networking cables (e.g., Ethernet or other communications cables), wireless network connections provided by wireless communications devices, and/or other network connections known in the art. In the illustrated embodiment, the networking node device 204 and the networking node device 208 are not directly connected to the networking switch device 202 by a network connection, and as discussed below must provide any network traffic that includes a destination that is reachable through the networking switch device 202 through one of the networking node devices (e.g., 206, 210) that is directly connected to the networking switch device 202 by a network connection (e.g., 206a, 210a). In the illustrated embodiment, the networking node device 204 is coupled to the networking node device 206 by one or more network connections 216a, the networking node device 206 is coupled to the networking node device 208 by one or more network connections 216b, the networking node device 208 is coupled to the networking node device 210 by one or more network connections 216c, and the networking node device 210 is coupled to the networking node device 204 by one or more network connections 216d. Similarly as discussed above, the networking node device 204 and the networking node device 208 must provide any traffic, which is received from the networking switch device 202 and that includes a destination address of a destination (e.g., host devices 212a-212d) that is reachable through the networking node devices 204-210, through one or more of the networking node devices 204-210 that is indirectly connected to the networking switch device 202 by the network connections 216a-216d. In the illustrated embodiment, only a few network connections between the networking switch device 202 and the networking node devices 204-210 have been provided for clarity of illustration and discussion, but one of skill in the art will recognize that many more networking connections may (and typically will) be provided between the networking node devices 204-210 and any number of networking switch devices while remaining within the scope of the present disclosure.

In the illustrated embodiment, the networking node device 204 is coupled to a host device 212*a*, the networking node device 206 is coupled to a host device 212*b*, the networking node device 208 is coupled to a host device 212*c*, and the networking node device 210 is coupled to a host device 212*d*. Any or all of the host devices 212*a-d* may be the IHS 100 discussed above with reference to FIG. 1 and/or include some or all of the components of the IHS 100. For example, the host devices 212*a-d* may be any of a variety of devices (e.g., server devices, storage devices, networking devices, desktop computing devices, mobile computing devices, and/or other computing devices known in the art) that are configured to direct traffic towards the networking switch device 202. Furthermore, the networking switch device 202 is coupled to a plurality of server devices 218*a*, 218*b*, 218*c*, and up to 218*d* that each may be the IHS 100 discussed above with reference to FIG. 1 and/or include some or all of the components of the IHS 100. In the examples provided below, the server devices 218*a-d* may be positioned in a rack that includes a TOR switch that is provided by the networking switch device 202. However, one of skill in the art in possession of the present disclosure will recognize that the server devices 218*a-d* may be replaced by other devices (e.g., storage devices), and those other devices may have traffic directed to them by the host devices 212*a-d* while remaining within the scope of the present disclosure. While specific examples of the loop prevention system 200 is illustrated and described herein, one of skill in the art in possession of the present disclosure will recognize that a variety of modifications to the devices, configuration, and/or other aspects of the loop prevention system 200 will fall within the scope of the present disclosure.

Figure 3:
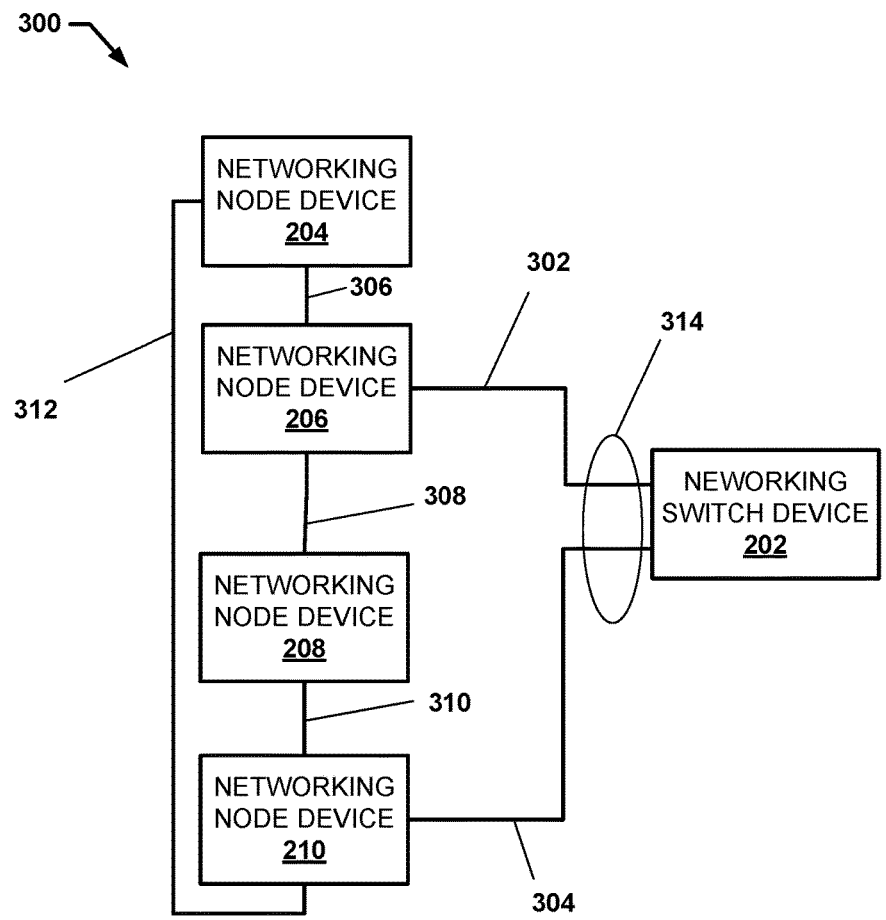
FIG. 3 is a schematic view illustrating an embodiment of networking node devices in a loop configuration provided by the loop prevention system of FIG. 2.

Referring now to FIG. 3, an embodiment of a loop configuration 300 that may be provided in the loop prevention system 200 of FIG. 2 is illustrated. In FIG. 3, the host devices 212*a-d* and server devices 216*a-d* in the loop prevention system 200 of FIG. 2 have been omitted for clarity of illustration and discussion, and the network connections 206*a*, 210*a*, and 216*a-c* have been replaced with one or more links that may be provided by those network connections. In the illustrated embodiment of the loop configuration 300, the networking node device 206 is directly linked to the networking switch device 202 by one or more links 302 that may be provided by the network connection 206*a*, and the networking node device 210 is directly linked to the networking switch device 202 by one or more links 304 that may be provided by the network connection 210*a*. The links 302 and 304 may be provided using any of a variety of communication protocols known in the art. Furthermore, the networking node device 204 and the networking node device 208 have no direct link to the networking switch device 202 due to, for example, the lack of a direct network connection to the networking switch device 202, as discussed above with reference to FIG. 2. In the discussions below of the loop configuration 300, the networking node devices 206 and 210 may be referred to as "directly-linked networking node devices" due to their direct links to the networking switch device 202, while the networking node devices 204 and 208 may be referred to as "indirectly linked networking node devices" due to their lack of direct links to the networking switch device 202 and their indirect linking to the networking switch device 202 via the networking node devices 206 and 210. While in the specific examples of the loop configuration 300 discussed below the lack of direct links to the networking switch device 202 are due to the lack of a direct network connection, the lack of a direct link may be due to a variety of other situations that will fall within the scope of the present disclosure.

In the illustrated embodiment, the networking node device 204 is coupled to the networking node device 206 by one or more links 306 that may be provided by the network connection 216*a*, the networking node device 206 is coupled to the networking node device 208 by one or more links 308 that may be provided by the network connection 216*b*, the networking node device 208 is coupled to the networking node device 210 by one or more links 310 that may be provided by the network connection 216*c*, and the networking node device 210 is coupled to the networking node device 204 by one or more links 312 that may be provided by the network connection 216*d*. As would be understood by one of skill in the art in possession of the present disclosure, the links 306, 308, 310, and 312 form a loop configuration of the networking node devices 204-210. In some embodiments below, the links 306, 308, 310, and 312 may be referred to as Inter-Port Links (IPLs), and may be provided using any of a variety of communication protocols known in the art. In the illustrated embodiment, only a few links between the networking switch device 202 and the networking node devices 204-210 have been provided for clarity of illustration and discussion, but one of skill in the art will recognize that many more links and loops may (and typically will) be provided between networking node devices while remaining within the scope of the present disclosure.

In the illustrated embodiment of the loop configuration 300, the networking switch device 202 is providing a multi-chassis LAG 314 by aggregating the links 302 and 304. In a specific example, the networking switch device 202 may be any of a variety of networking switches provided by DELL®, Inc. of Round Rock, Tex., United States that are configured to perform Virtual Link Trunking (VLT) to provide a multi-chassis LAG that may be referred to as a VLT LAG, with the VLT LAG providing a VLT port that is directly accessible through each of the direct links in the VLT LAG. In such embodiments, IPLs provided by the links 306, 308, 310, and 312 may be referred to as Inter-Chassis Links (ICLs). As such, FIG. 3 illustrates the loop configuration 300 that includes the networking switch device 202 providing a multi-chassis LAG/VLT LAG 314 that utilizes direct links 302 and 304 to networking node devices 206 and 210, with the networking node devices 204 and 208 that do not have a direct link to the networking switch device 202 that is providing the multi-chassis LAG/VLT LAG 314 coupled to the networking node devices 206 and 210 by inter-port/inter-chassis links 306, 308, 310, and 312.

Figure 4:
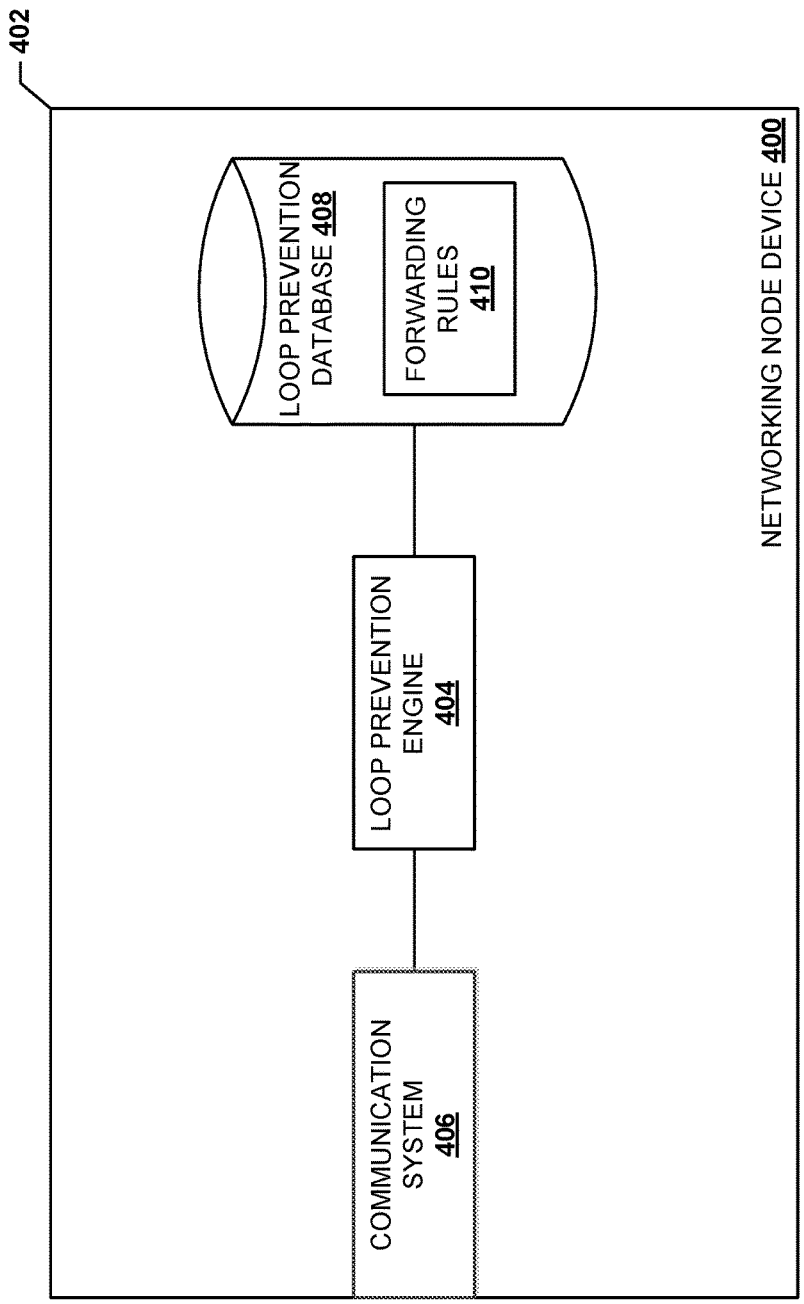
FIG. 4 is a schematic view illustrating an embodiment of a networking node device that may be provide in the loop prevention system of FIG. 2 and the loop configuration of FIG. 3.

Referring now to FIG. 4, an embodiment of a networking node device 400 is illustrated. The networking node device 400 may be any of the networking node devices 204, 206, 208, and/or 210 discussed above with reference to FIGS. 2 and 3. As such, the networking node device 400 may be the IHS 100 discussed above with reference to FIG. 1 and/or include some or all of the components of the IHS 100. The networking node device 400 includes a chassis 402 that houses the components of the networking node device 400, only some of which are illustrated in FIG. 4. The chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a loop prevention engine 404 that is configured to perform the functions of the loop prevention engines and the networking node devices discussed below.

The chassis 402 also houses a storage system (not illustrated, but which may include the storage device 108 discussed above with reference to FIG. 1) that is coupled to the loop prevention engine 404 (e.g., via a coupling between the storage system and the processing system) and that includes a loop prevention database 408. As discussed below, the loop prevention engine 404 may generate, receive/retrieve (e.g., through the communication system 406), determine, and/or otherwise identify the forwarding rules 410 discussed below and store those forwarding rules 410 in the loop prevention database 408. The chassis 402 may also house a communication system 406 that is coupled to the loop prevention engine 404 (e.g., via a coupling between the communication system 406 and the processing system) and that may include a Network Interface Controller (NIC), a wireless communication subsystem (e.g., a WiFi subsystem, a Bluetooth subsystem, etc.), and/or a variety of other communication system components known in the art. While a specific networking node device 400 has been illustrated and described, one of skill in the art in possession of the present disclosure will recognize that networking node devices may include a variety of components other than those described above and that provide for the performance of conventional networking node device functionality, as well as the functionality discussed below, while remaining within the scope of the present disclosure.

Figure 5:
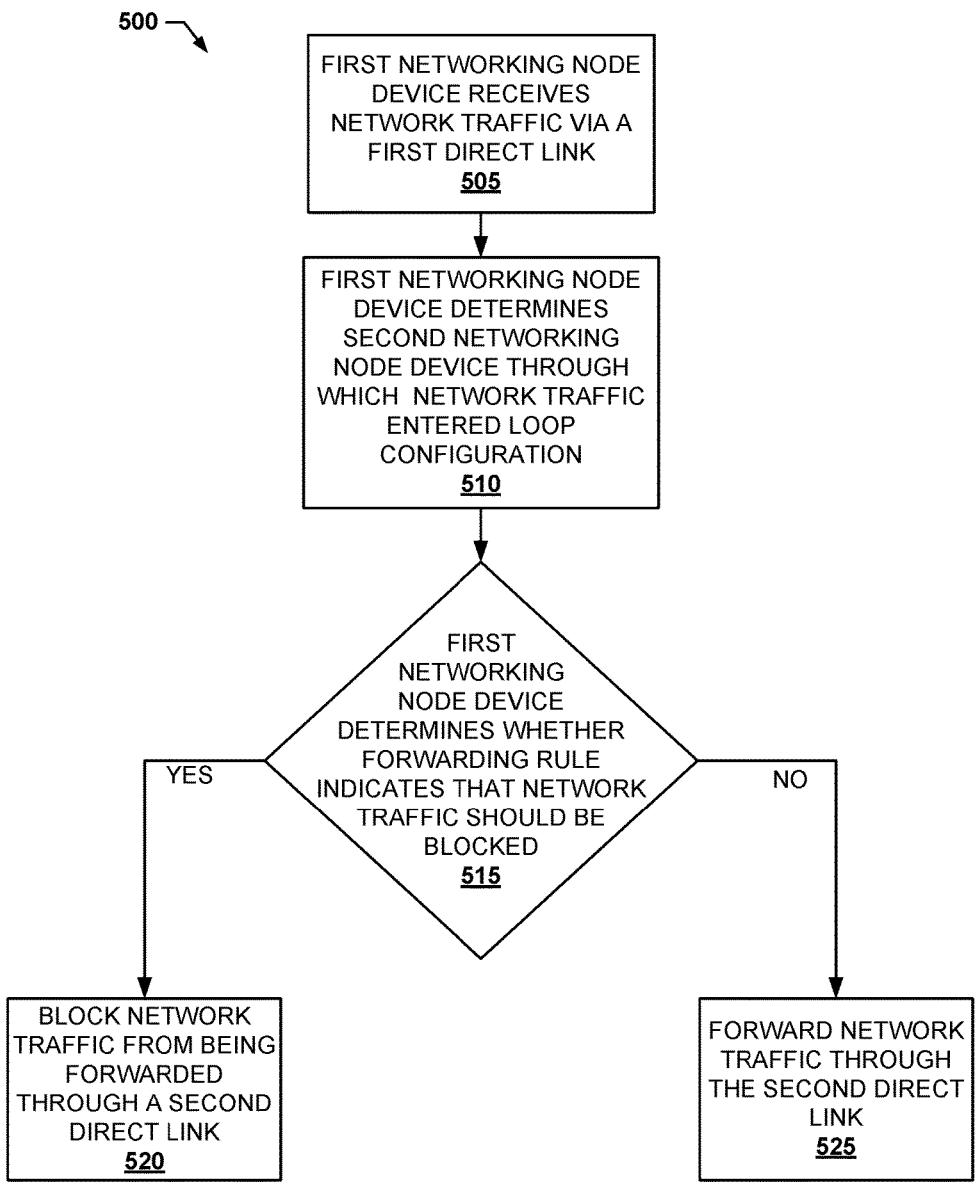
FIG. 5 is a flow chart illustrating an embodiment of a method of preventing loops.

Referring now to FIG. 5, an embodiment of a method 500 for preventing loops is illustrated. As discussed above, in loop prevention systems, networking node devices may be provided in a loop configuration as a result of, for example, network connections between the networking node devices that provide redundancy if one of the network connections is to fail. However, layer-2 logical loops can occur in such loop configurations, and can result in the continuous provisioning of the same network traffic to each networking node device, thus clogging or otherwise wasting the network bandwidth. Conventional loop prevention systems include protocols such as the Spanning Tree Protocol (STP) that prevent such layer-2 loops. However, these loop prevention systems reduce the available bandwidth of the system by completely blocking links between networking node devices in order to prevent logical loops. The loop prevention system of the present disclosures provides for loop prevention while utilizing all of the links between each of the networking node devices in the loop configuration by blocking network traffic from being forwarded on a link based on which of the networking node devices the network traffic entered the loop configuration through. Thus, a first portion of the total network traffic in the loop configuration may be blocked at a link in the loop configuration, while that link is utilized to provide a second portion of the total network traffic in the loop configuration. In order to provide the loop prevention system of the present disclosure, each networking node device may generate a set of forwarding rules that are used by that networking node device to determine whether to block network traffic from being forwarded to a neighboring networking node device and that are based on shortest path trees for each networking node. Those forwarding rules help to provide the loop prevention system of the present disclosure that breaks loops without completely blocking any of the links in the loop configuration.

The method 500 begins at block 505 where a first networking node device receives network traffic via a first direct link. In an embodiment, at block 505, a plurality of networking node devices may be provided in a loop configuration such that the plurality of networking node devices include the first networking node device that includes the first direct link that connects the first networking node device to a different networking node device in the loop configuration, and a second direct link that connects the first networking node device to a yet another different networking node device in the loop configuration. In an embodiment, the first direct link and the second direct link may be provided by IPLs, and the network traffic may include Broadcast traffic, Unknown unicast traffic, Multicast (BUM) traffic, and/or a variety of other traffic that may be provided via at least one packet. For example, as illustrated in FIG. 3, the networking node device 204 may receive network traffic through the link 306 from the networking node device 206, and/or through the link 312 from the networking node device 210. In the specific example discussed above where the networking switch device 202 provides the multi-chassis LAG as a VLT LAG, the loop prevention engine 404 included in the networking node device 204 may receive the network traffic through the communication system 406 of FIG. 4 via the link 306 that may be provided by an ICL. While the networking node device 204 is used as an example of the first networking node device in the discussions below, one of skill in the art in possession of the present disclosure would understand that the first networking node device may be provided by any of the networking node devices 206-210, and the first direct link and the second direct link may include respective links 306-312 to any of its directly connected networking node devices 206-210.

The method 500 then proceeds to block 510 where the first networking node device determines a second networking node device in the loop configuration through which the network traffic entered the loop configuration. In an embodiment, at block 510, when network traffic enters the loop configuration 300, the second networking node device through which the network traffic enters the loop configuration 300 may add a second networking node device identifier to the network traffic that identifies the second networking node device. For example, the second networking node device may add a media access control (MAC) address, Internet protocol (IP) address, a user defined identifier, and/or any other networking node device identifier known in the art, to each of the packets included in the network traffic that is received at the second networking node device through a link that is not part of the loop configuration (i.e., that is not connected to another of the networking node devices to provide the loop configuration). In other examples, the second networking node device identifier may be associated with the second networking node device by, for example, including a source device identifier of a source device that provided the network traffic to the networking node device.

Figure 7:
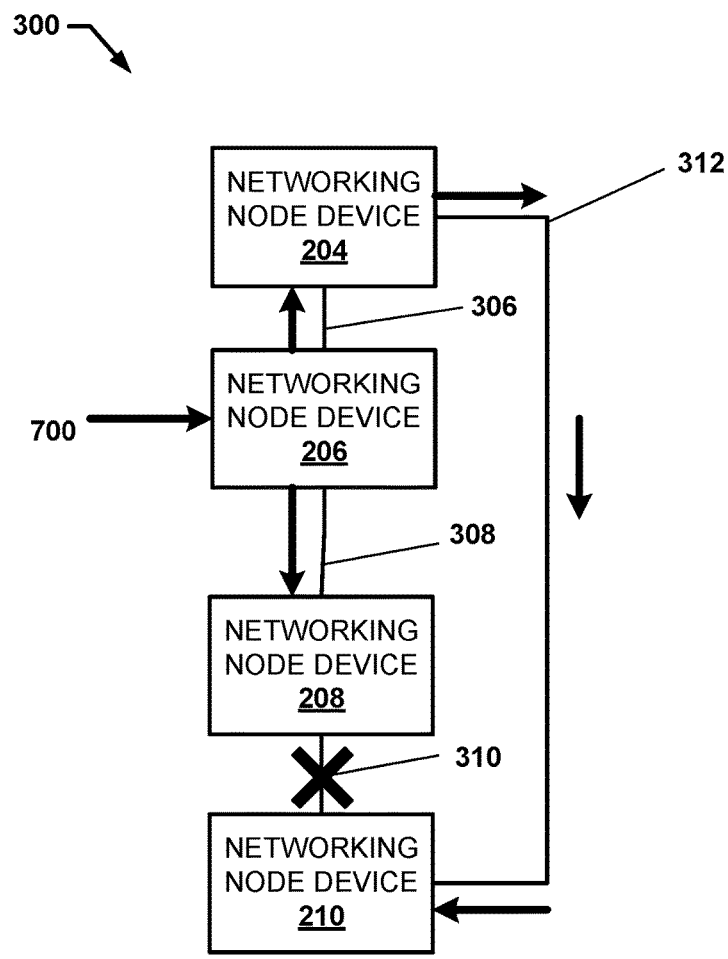
FIG. 7 is a schematic view illustrating an embodiment of preventing a loop in the loop configuration of FIG. 3.

Referring to FIG. 7, a specific example is illustrated in which the networking node device 206 receives network traffic 700 (i.e., from the host device 212b and/or the networking switch device 202) through a link (e.g., the link 302) that is not part of the loop configuration 300. As illustrated, the network traffic 700 enters the loop configuration 300 at the networking node device 206, and as discussed above, the loop prevention engine 404 in the networking node device 206 may add a networking node device identifier to the network traffic 700 that identifies and/or is associated with the networking node device 206. The networking node device 206 may then forward the network traffic through the links 306 and/or 308.

Figure 8:
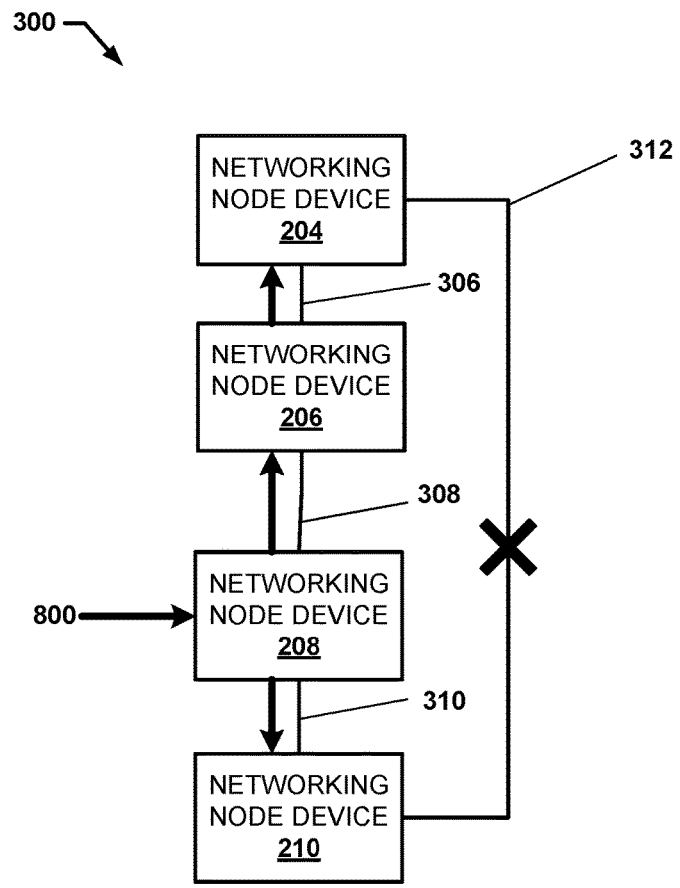
FIG. 8 is a schematic view illustrating an embodiment of preventing a loop in the loop configuration of FIG. 3.

Referring to FIG. 8, a specific example is illustrated in which the networking node device 208 receives network traffic 800 (i.e., from the host device 212c) through a link that is not part of the loop configuration 300. As illustrated, the network traffic 800 enters the loop configuration 300 at the networking node device 208, and as discussed above, the loop prevention engine 404 in the networking node device 208 may add a networking node device identifier to the network traffic 800 that identifies and/or is associated with the networking node device 208. The networking node device 208 may then forward the network traffic through the links 308 and/or 310.

Figure 9:
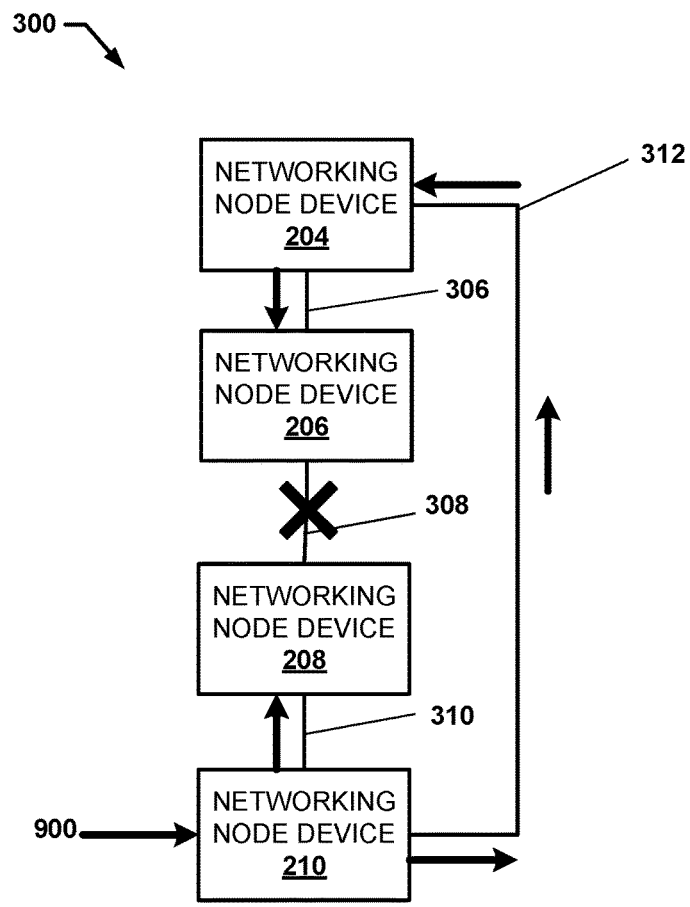
FIG. 9 is a schematic view illustrating an embodiment of preventing a loop in the loop configuration of FIG. 3.

Referring to FIG. 9, a specific example is illustrated in which the networking node device 210 receives network traffic 900 (i.e., from the host device 212d and/or the networking switch device 202) through a link (e.g. the link 304) that is not part of the loop configuration 300. As illustrated, the network traffic 900 enters the loop configuration 300 at the networking node device 210, and as discussed above, the loop prevention engine 404 in the networking node device 210 may add a networking node device identifier to the network traffic 900 that identifies and/or is associated with the networking node device 210. The networking node device 210 may then forward the network traffic through the links 310 and/or 312.

Figure 10:
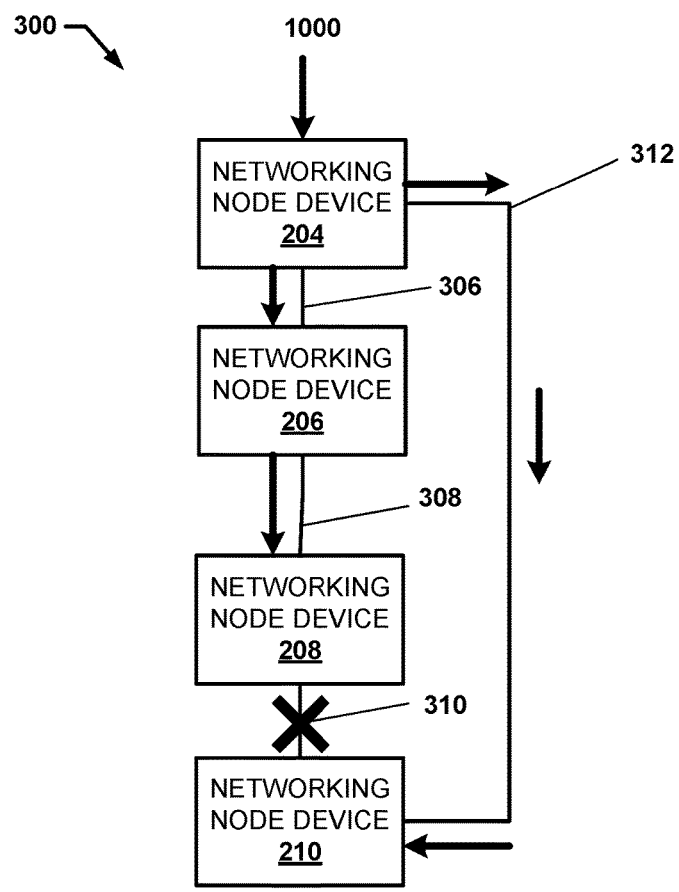
FIG. 10 is a schematic view illustrating an embodiment of preventing a loop in the loop configuration of FIG. 3.

Referring to FIG. 10, a specific example is illustrated in which the networking node device 204 receives network traffic 1000 (i.e., from the host device 212a) through a link that is not part of the loop configuration 300. As illustrated, the network traffic 1000 enters the loop configuration 300 at the networking node device 204, and as discussed above, the loop prevention engine 404 in the networking node device 204 may add a networking node device identifier to the network traffic 900 that identifies and/or is associated with the networking node device 204. The networking node device 210 may then forward the network traffic through the links 306 and/or 312.

Furthermore, any of the networking node devices 204-210 may receive the network traffic that enters the loop configuration via another networking node device that received that network traffic via a link that is not part of the loop configuration 300. In any of the examples discussed above, when the networking switch device 202 provides the multi-chassis LAG as a VLT LAG, the loop prevention engine 404 of the any of the networking node devices 204-210 may receive the network traffic through the communication system 406 of FIG. 4, add the networking node device identifier to the network traffic that identifies and/or is associated with that networking node device, and then forward the network traffic to the other networking node devices in the loop configuration over the ICLs. At block 510, the loop prevention engine 404 in the first networking node device that receives the network traffic through the first direct link will operate to determine the second networking node device through which network traffic entered the loop configuration 300 based on the second networking node device identifier that was added to packets of the network traffic by the second networking node device.

The method 500 then proceeds to decision block 515, where the first networking node device determines whether a forwarding rule indicates that the network traffic should be blocked based on the networking node device through which the network traffic entered the loop configuration. In an embodiment, at decision block 515, in response to receiving the network traffic via the communication system 406 and identifying the second networking node device identifier in the network traffic, the loop prevention engine 404 in the first networking node device may reference the forwarding rules 410 stored in the loop prevention database 408. In an embodiment, the loop prevention engine 404 may use the second networking node device identifier determined at block 510 to reference the forwarding rules 410 in the loop prevention database 408 to determine if any of those forwarding rules are associated with that second networking node device identifier. As discussed in more detail below, the forwarding rules 410 may indicate whether the loop prevention engine 404 should block the network traffic received through the first direct link from the second networking node device from being forwarded through a second direct link to a third networking node device in the loop configuration 300 at block 520, or forward the network traffic received through the first direct link from the second networking node device through the second direct link to the third networking node device in the loop configuration 300 at block 525.

In an embodiment, the forwarding rules 410 may include a forwarding rule for each networking node device in the loop configuration 300 that provides at least one link for network traffic to enter the loop configuration 300. For example, the networking node device 204 may include forwarding rules for network traffic that enters the loop configuration 300 through the networking node device 206, the networking node device 208, and/or the networking node device 210. Similarly, the networking node device 206 may include forwarding rules for network traffic that enters the loop configuration 300 through the networking node device 204, the networking node device 208, and/or the networking node device 210; the networking node device 208 may include forwarding rules for network traffic that enters the loop configuration through the networking node device 204, the networking node device 206, and/or the networking node device 210; and the networking node device 210 may include forwarding rules for network traffic that enters the loop configuration 300 through the networking node device 204, the networking node device 206, and/or the networking node device 208.

Figure 6:
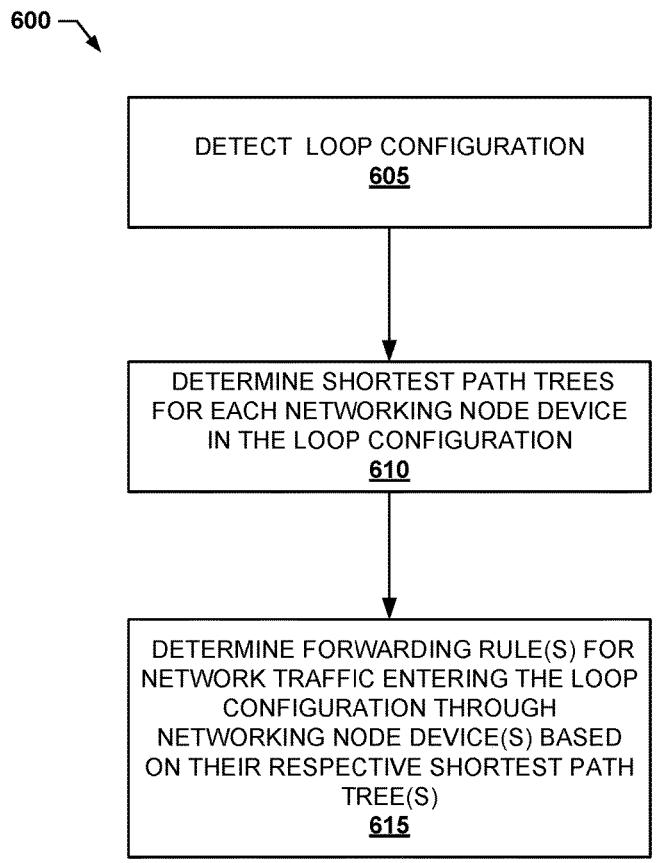
FIG. 6 is a flow chart illustrating an embodiment of generating forwarding rules for preventing loops in the method of FIG. 5.

Referring to FIG. 6, an embodiment of a method 600 for determining forwarding rules for the loop prevention system of the present disclosure is illustrated. In an embodiment, each networking node device in a loop configuration may operate according to the method 600 to determine a forwarding rule for any received network traffic that entered the loop configuration through a particular networking node device in the loop configuration. The method 600 begins at block 605 where a first networking node device detects that it is included in a loop configuration. In an embodiment, the loop prevention engine 404 in each networking node device 204-210 may include control plane features that are configured to recognize and distribute a current topology of the loop prevention system 200 that includes the topology of the networking node devices 204-210. For example, the loop prevention engine 404 in any of the networking node devices 204-210 may distribute forwarding and link/VLT level information that it determines, as well as receive forwarding and link/VLT level information determined by each of the other networking node device 204-210 in the loop prevention system 200, and use that forwarding and link/VLT level information to build the current topology of the loop prevention system 200. Based on that current topology, the loop prevention engine 404 in each networking node device 204-210 may detect whether its respective networking node device 204-210 is included in a loop configuration (e.g., the loop configuration 300).

The method 600 then proceeds to block 610 where the first networking node device determines a shortest path tree for each networking node device in the loop configuration. In an embodiment, at block 610 and in response to detecting the loop configuration, the loop prevention engine 404 of the networking node device 400 (e.g., any of the networking node devices 204-210) may generate the shortest path tree for that networking node device 400 based on the current topology of the loop prevention system 200. In an embodiment, the shortest path tree may be the shortest distance path from a root networking node device to any other networking node device in a graph of the loop configuration. For example, the loop prevention engine 404 may include a shortest path tree algorithm such as Dijkstra, Bellman-Ford, and/or any other shortest path tree algorithms known in the art that are configured to generate a shortest path tree.

Figure 11A:
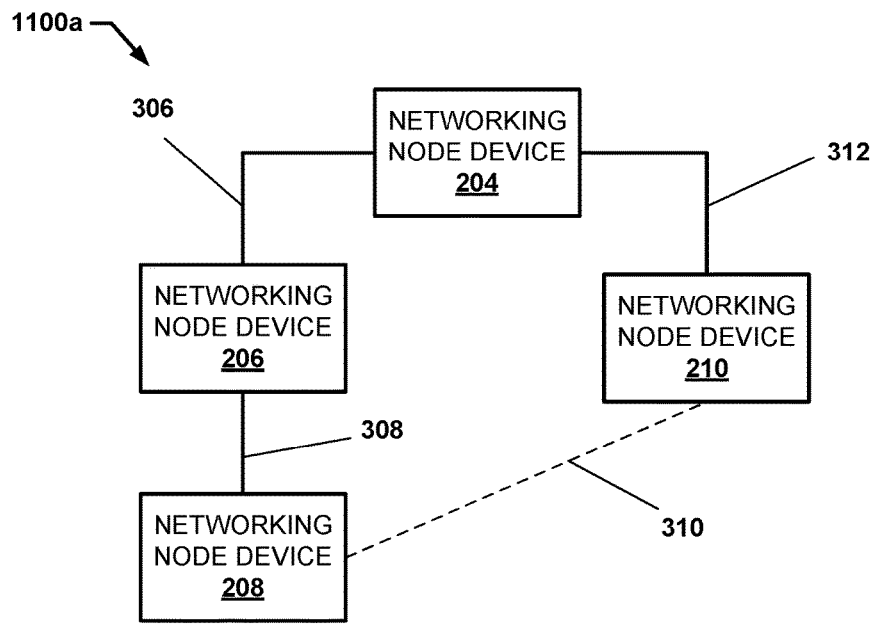
FIGS. 11A-11D are schematic views illustrating embodiments of shortest path trees for each networking node device in the loop configuration of FIG. 3.

For example, referring to FIG. 11A, an embodiment of a shortest path tree 1100a is illustrated where the root networking node device is the networking node device 204. As can be seen, the shortest path from the networking node device 204 to the networking node device 206 is through the link 306, the shortest path from the networking node device 204 to the networking node device 210 is through the link 312, and the shortest path from the networking node device 204 to the networking node device 208 is through the link 306, the networking node device 206, and the link 308. As illustrated, the link 310 is missing from the shortest tree path 1100a (as denoted by the hashed line.) However, one of skill in the art will recognize that the link 312, the networking node device 210, and the link 310 provide a path that is the same "distance" between the networking node device 204 and the networking node device 208 as the path defined by the link 306, the networking node device 206, and the link 308. In some embodiments, the loop prevention engine 404 may include a "tie-breaker" algorithm that compares the MAC addresses of the immediate upstream neighbors of a networking node device (e.g., the networking node device 208) that has multiple shortest paths to the root networking node device, and may select the path that includes an immediately upstream networking node device (e.g., one of the networking node devices 206 and 210) that includes a MAC address with particular characteristics (e.g., the "greatest" or, in various embodiments, "lowest" MAC address). For example, the "tie-breaker" algorithm may compare the MAC addresses starting from the left most digit and move to the right most digit until a greatest and lowest value for that digit is determined. Each digit may be a value of 0, 1, 2, 3, 4, 5, 6, 7, 8, 9, A, B, C, D, E, or F where 0 is the lowest value and F is the highest value. Thus, a MAC address of 00A0.91B2.83C2 is greater than a MAC address of 0090.ABC1.002F. As illustrated in the shortest path tree 1100a, the networking node device 206 may have had, for example, a greater MAC address than the networking node device 210, causing the loop prevention engine 404 of the networking node device 204 to select the path that includes the link 306, the networking node device 206, and the link 308. While a MAC address is contemplated as being used as a "tie-breaker" when selecting between two or more equal shortest paths, other identifiers (e.g., an IP address) and/or data that is readily available and unique for all networking node devices may be utilized as a "tie-breaker" while remaining within the scope of the present disclosure.

Figure 11B:
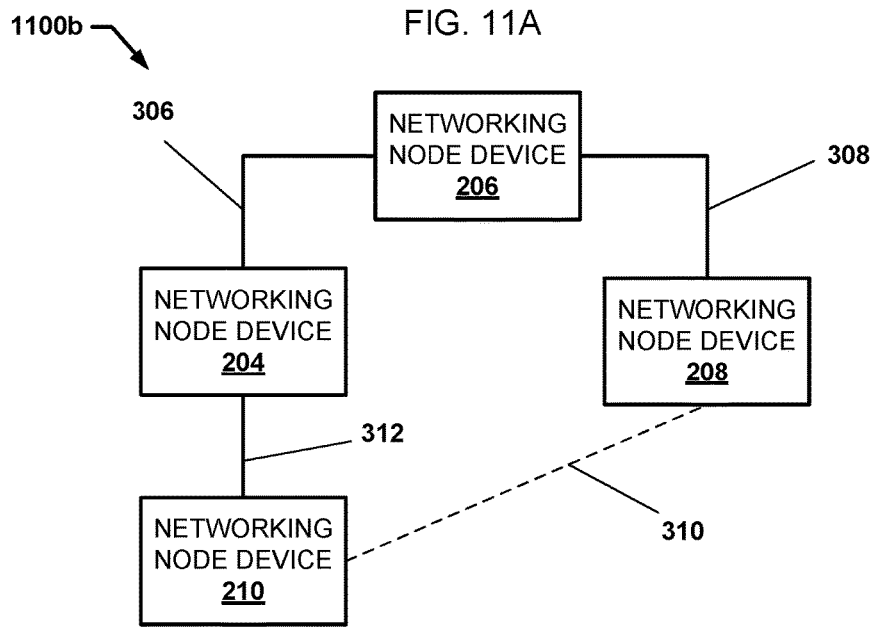

In various embodiments, in response to detecting the loop configuration, the loop prevention engine 404 of the networking node device 400 (e.g., any of the networking node devices 204-210) may generate the shortest path tree for any of the networking node devices in the loop configuration based on the current topology of the loop prevention system 200. For example, in the loop configuration 300, the shortest path tree 1100b illustrated in FIG. 11B may be generated with networking node device 206 as the root networking node device. As illustrated in FIG. 11B, the shortest path from the networking node device 206 to networking node device 204 is through the link 306; the shortest path from the networking node device 206 to the networking node device 208 is through the link 308; and the shortest path from the networking node device 206 to the networking node device 210 is through the link 306, the networking node device 204, and the link 312. As illustrated, the link 310 is missing in the second shortest path tree 1100b (as denoted by the hashed line) for similar reasons as discussed above with the shortest path tree 1100a of FIG. 11A.

Figure 11C:
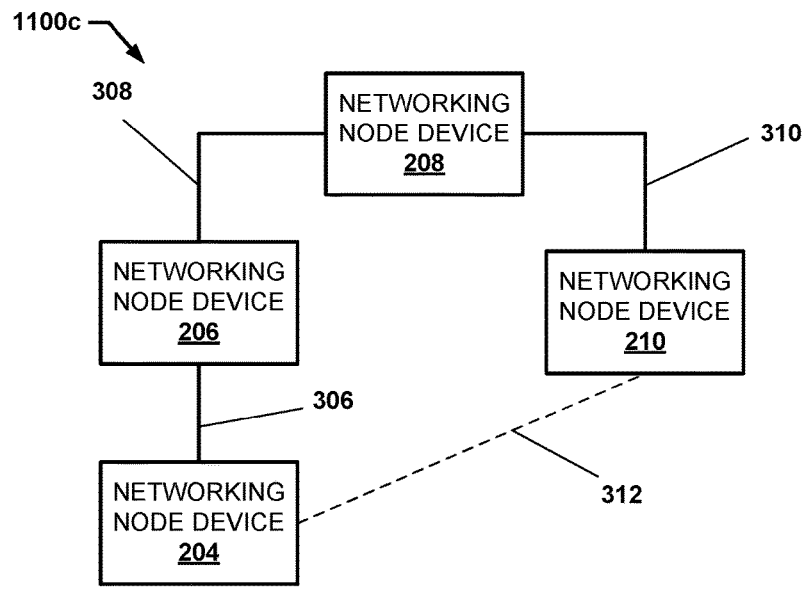

Similarly, FIG. 11C illustrates an embodiment of a third shortest path tree 1100c for the loop configuration 300 where the networking node device 208 is the root networking node device. As illustrated in FIG. 11C, the shortest path from the networking node device 208 to the networking node device 206 is through the link 308; the shortest path from the networking node device 208 to the networking node device 210 is through the link 310; and the shortest path from the networking node device 208 to the networking node device 204 is through the link 308, the networking node device 206, and the link 306. As illustrated, the link 312 is missing in the third shortest path tree 1100c (as denoted by the hashed line) for similar reasons as discussed above with the shortest path tree 1100a of FIG. 11A.

Figure 11D:
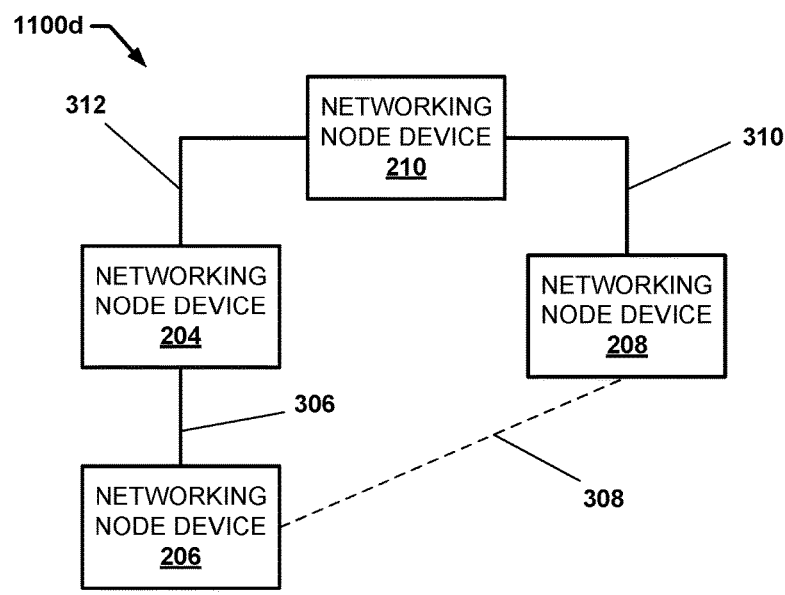

Similarly, FIG. 11D illustrates an embodiment of a fourth shortest path tree 1100d for the loop configuration 300 where the networking node device 210 is the root networking node device. As illustrated in FIG. 11C, the shortest path from the networking node device 210 to the networking node device 204 is through the link 312; the shortest path from the networking node device 210 to the networking node device 208 is through the link 310; and the shortest path from the networking node device 210 to the networking node device 206 is through the link 312, the networking node device 204, and the link 306. As illustrated, the link 308 is missing in the fourth shortest path tree 1100d (as denoted by the hashed line) for similar reasons as discussed above with the shortest path tree 1100a of FIG. 11A.

Because the loop prevention engine 404 is distributed on each networking node device in the loop configuration 300, each networking node device in the loop configuration 300 may determine its own shortest path tree and the shortest path trees of the other networking node devices in the loop configuration 300. However, in various embodiments, the first networking node device may provide the first shortest path tree to the other networking node devices in the loop configuration. For example, the networking node device 204 may provide its first shortest path tree to each of the other networking node devices 206-210 in the loop configuration 300. Specifically, the loop prevention engine 404 in the networking node device 204 may provide the shortest path tree 1100a discussed above with reference to FIG. 11, which provides the networking node device 204 as the root networking node, through the communication system 406 to each of the networking node device 206, the networking node device 208, and the networking node device 210. Similarly, in various embodiments, the first networking node device receives respective shortest path trees for each networking node device in the loop configuration, with each of those respective shortest path trees determined for a root networking node that is the networking node device in the loop configuration that provided that respective shortest path tree. The loop prevention engine 404 of the networking node device 204 may receive a second shortest path tree, and up to an N-shortest path tree (depending on the number of networking node devices in the loop configuration 300) through its communication system 406.

The method 600 then proceeds to block 615 where the first networking node device determines forwarding rule(s) for network traffic that enters the loop configuration through networking node devices, and that is subsequently received at the first networking node device, based on the shortest path trees for those networking node devices. In an embodiment, at block 615, the loop prevention engine 404 of the networking node device 400 may determine whether any of the direct links from the first networking node device to the loop configuration 300 are included in, or missing in, each of the shortest path trees that were received. For example, if one or more of those direct links are included in the shortest path tree for a root networking node device, then the loop prevention engine 404 of the first networking node device may generate a forwarding rule for network traffic that enters the loop configuration through that root networking node device (and that is subsequently received by the first networking node device) that will cause the first networking node device to permit that network traffic on those direct links. However, if a direct link of the first networking node is missing from a shortest path tree of a root networking node device (e.g., which may be determined by comparing the shortest path tree to the current topology), then the loop prevention engine 404 of the first networking node device may generate a forwarding rule for network traffic that enters the loop configuration through that root networking node device (and that is subsequently received by the first networking node device) that will cause the first networking node device to block that network traffic from being forwarded on that direct link that is missing from the shortest path tree of the root networking device. The loop prevention engine 404 may store the forwarding rules in a forwarding rule table that may provide the forwarding rules 410 of the loop prevention database 408.

In a specific example, the first networking node device may be the networking node device 204, and may determine the shortest path tree 1100*b* for the networking node device 206, the shortest path tree 1100*c* for the networking node device 208, and the shortest path tree 1100*d* for the networking node device 210. The networking node device 204 may then generate a forwarding rule for networking traffic that enters the loop configuration 300 at each of the networking node devices 206-210 based on their respective shortest path trees. For example, both of the links 306 and 312 are included in the shortest path tree 1100*b* and, as such, a forwarding rule may be created by the networking node device 204 to permit its received network traffic, which enters the loop configuration 300 at the networking node device 206, on the links 306 and 312. Similarly, both the links 306 and 312 are included in the shortest path tree 1100*d* and, as such, a forwarding rule may be created by the networking node device 204 to permit its received network traffic, which enters the loop configuration 300 at the networking node device 210, on the links 306 and 312. However, only the link 306 is included in the shortest path tree 1100*c*, while the link 312 is missing from that shortest path tree. As such, a forwarding rule may be created by the networking node device 204 to block its received network traffic, which enters the loop configuration 300 at the networking node device 208, on the link 312. While the specific example provided above discusses how the networking node device 204 generates forwarding rules, one of skill in the art will recognize that the networking node devices 206-210 may generate their forwarding rules through a similar process while remaining within the scope of the present disclosure.

FIG. 12A illustrates an embodiment of a forwarding rule table 1200*a* for the networking node device 204, which may be assigned a first networking node device identifier (e.g., "1" in the illustrated embodiment) and may provide the forwarding rule(s) 410 in the loop prevention database 408 included in the networking node device 204. As illustrated, the forwarding rule table 1200*a* includes a root networking node device column 1202 that indicates the other networking node devices 206-210 in the loop configuration 300. The networking node device 206 may be assigned a second networking node device identifier (e.g., "2" in the illustrated embodiment), the networking node device 208 may be assigned a third networking node device identifier (e.g., "3" in the illustrated embodiment), and the networking node device 210 may be assigned a fourth networking node device identifier (e.g., "4" in the illustrated embodiment). The forwarding rule table 1200*a* also includes a missing link list column 1204, which may include the direct links that couple the networking node device 204 to the loop configuration 300, and that are missing from the shortest path trees associated with the networking node devices 206-210. In the specific example where the networking node device 204 is a VLT node, then the missing links of the missing link list column 1204 may be any ICLs and/or ICL ports that are missing from shortest path trees. As illustrated, the missing link list column 1204 indicates that the shortest path tree 1100*b* of the networking node device 206 and the shortest path tree 1100*d* of the networking node device 210 have no missing ICLs, while the shortest path tree 1100*c* of the networking node device 208 is missing the link (indicated by "ICL(1,4)") between the networking node device 204 (with the first networking node device identifier "1") and the networking node device 210 (with the fourth networking node device identifier "4").

The forwarding rule table 1200*a* may also include a forwarding rule column 1206 that includes a forwarding rule for each networking node device 206-210. As discussed below, the forwarding rules provided in the forwarding rule column 1206 may be utilized to block network traffic towards particular ICLs when that network traffic is received from a particular networking node device. For example, because there were no missing links in the shortest path tree 1100*b* for the networking node device 206 and in the shortest path tree 1100*c* for the networking node device 210, then there may be no forwarding rule for network traffic that enters the loop configuration 300 through those networking node devices 206 and 210 and that is subsequently received by the networking node device 204 (i.e., because some other subsystem in the loop prevention system 200 is configured to forward that network traffic when no forwarding rule exists in the forwarding rule column 1206.) However, one of skill in the art in possession of the present disclosure will recognize that a specific forwarding rule may be created and/or provided in the forwarding rule column 1206 that identifies the networking node device 206 and/or the networking node device 210, and that provides an associated action to permit and/or forward network traffic on the direct links from the networking node device 204 when that network traffic enters the loop configuration 300 through the networking node device 206 and/or the networking node device 210 and is received by the networking node device 204. However, with respect to the networking node device 208 in this example, because the shortest path tree was missing the link (indicated by "ICL(1,4)") between the networking node device 204 and the networking node device 210, a forwarding rule is provided in the forwarding rule column 1206 for network traffic that enters the loop configuration 300 through networking node device 208 and that is subsequently received at the networking node device 204. In the illustrated embodiment, that forwarding rule may identify the third networking node identifier for the networking node device 208 (e.g., "Node ID 3") to cause the loop prevention engine 404 to monitor when the networking node device 204 receives network traffic that entered the loop configuration 300 through the networking node device 208, and may include an action that causes the loop prevention engine 404 to block that network traffic from being forwarded through the link 312 (e.g., "ICL (1,4)")

Similarly FIG. 12B illustrates an embodiment of a forwarding rule table 1200b generated by the networking node device 206, which may be coupled to the loop configuration 300 through the direct links 306 and 308 as discussed above. As discussed above with regard to the shortest path tree 1100a in which the root networking node device is the networking node device 204, and the shortest path tree 1100c in which the root networking node device is the networking node device 208, both of the direct links 306 and 308 are present in those shortest path trees 1100a and 1100c. Thus, the missing link list column 1204 of the forwarding rule table 1200b may identify no missing links for the networking node devices 204 and 208, and the forwarding rule column 1206 may thus include no forwarding rule for network traffic that enters the loop configuration 300 through the networking node device 204 or the networking node device 208, and that is subsequently received by the networking node device 206. As such, the networking node device 206 may operate to forward the network traffic that enters the loop configuration 300 through the networking node device 204 and the networking node device 208 through the links 306 and 308 (e.g., due to no forwarding rule being present in the forwarding rule table 1200b for the networking node devices 204 and 208.) However, as discussed above with regard to the shortest path tree 1100d in which the root networking node device is the networking node device 210, the direct link 306 is present while the direct link 308 is missing from that shortest path tree 1100d. Thus, the missing link list column 1204 identifies the missing direct link (e.g., "ICL (2,3)") between the networking node device 206 and the networking node device 208, and the forwarding rule column 1206 include a forwarding rule for network traffic that enters the loop configuration 300 through the networking node device 210. In the illustrated embodiment, that forwarding rule may identify the fourth networking node device identifier for the networking node device 210 (e.g., "node ID 4") to cause the loop prevention engine 404 to monitor when the networking node device 206 receives network traffic that entered the loop configuration 300 through the networking node device 210, and may include an action that causes the loop prevention engine 404 to block that network traffic from being forwarded through the link 308 (e.g., "ICL (2,3)").

FIG. 12C illustrates an embodiment of a forwarding rule table 1200c generated by the networking node device 208, which may be coupled to the loop configuration 300 through the direct links 308 and 310 as discussed above. As discussed above with regard to the shortest path tree 1100a in which the root networking node device is the networking node device 204, and the shortest path tree 1100b in which the root networking node device is the networking node device 206, the direct link 310 is missing in the shortest path trees 1100a and 1100b. Thus, the missing link list column 1204 of the forwarding rule table 1200c identifies the missing direct link (e.g., "ICL (3,4)") between the networking node device 208 and each of the networking node devices 204 and 206. The forwarding rule column 1206 for each of the networking node devices 204 and 206 may then include a forwarding rule for network traffic that enters the loop configuration 300 through either the networking node device 204 or the networking node device 206. In the illustrated embodiment, that forwarding rule may identify the first networking node device identifier of the networking node device 204 (e.g., "node ID 1") and second networking node device identifier for the networking node device 206 (e.g., "node ID 2") to cause the loop prevention engine 404 to monitor when the networking node device 208 receives network traffic that entered the loop configuration 300 through the networking node devices 204 and 206, and may include an action that causes the loop prevention engine 404 to block that network traffic from being forwarded on the link 310 (e.g., "ICL (3,4)").

Similarly, as discussed above with regard to shortest path tree 1100d in which the root networking node device is the networking node device 210, the direct link 310 is present while the direct link 308 is missing from the shortest path tree 1100d. Thus, the missing link list column 1204 identifies the missing direct link (e.g., "ICL (3,2)") between the networking node device 208 and the networking node device 206. The forwarding rule column 1206 may then include a forwarding rule for network traffic that enters the loop configuration 300 through the networking node device 210. In the illustrated embodiment, that forwarding rule may identify the fourth networking node device identifier of the networking node device 210 (e.g., "node ID 4") to cause the loop prevention engine 404 to monitor when the networking node device 208 receives network traffic that entered the loop configuration 300 through the networking node device 206, and may include an action that causes the loop prevention engine 404 to block that network traffic from being forwarded on the link 308 (e.g., "ICL (3,2)").

FIG. 12D illustrates an embodiment of a forwarding rule table 1200d generated by the networking node device 210, which may be coupled to the loop configuration 300 through the direct links 310 and 312 as discussed above. As discussed above with regard to the shortest path tree 1100a in which the root networking node device is the networking node device 204, and the shortest path tree 1100b in which the root networking node device is the networking node device 206, the direct link 310 is missing in those shortest path trees 1100a and 1100b. Thus, the missing link list column 1204 of the forwarding rule table 1200d may identify the missing direct link (e.g., "ICL (4,3)") between the networking node device 210 and the networking node device 208. The forwarding rule column 1206 for both the networking node devices 204 and 206 may then include a forwarding rule for network traffic that enters the loop configuration 300 through either the networking node device 204 or the networking node device 206. In the illustrated embodiment, that forwarding rule may identify the first networking node device identifier of the networking node device 204 (e.g., "node ID 1") and the second networking node device identifier of the networking node device 206 (e.g., "node ID 2") to cause the loop prevention engine 404 to monitor when the networking node device 210 receives network traffic that entered the loop configuration 300 through the networking node devices 204 and 206, and may include an action that causes the loop prevention engine 404 to blocked that network traffic from being forwarded on the link (e.g., "ICL (4,3)") 0.

Similarly, as discussed above with regard to shortest path tree 1100c in which the root networking node device is the networking node device 208, the direct link 310 is present while the direct link 312 is missing from the shortest path tree 1100c. Thus, the missing link list column 1204 identifies the missing direct link (e.g., "ICL (4,1)") between the networking node device 210 and the networking node device 204. The forwarding rule column 1206 may then include a forwarding rule for network traffic that enters the loop configuration 300 through the networking node device 208. In the illustrated embodiment, that forwarding rule may identify the third networking node device identifier of the networking node device 208 (e.g., "node ID 3"), to cause the loop prevention engine 404 to monitor when the networking node device 210 receives network traffic that entered the loop configuration 300 through the networking node devices 208, and may include an action that causes the loop prevention engine 404 to block that network traffic from being forwarded on the link (e.g., "ICL (4,1)").

Returning to method 500 of FIG. 5, at decision block 515, if the first networking node device determines a forwarding rule indicates that the network traffic should be blocked, then the method 500 proceeds to block 520, where the first networking node device blocks network traffic received on the first direct link from being forwarded through a second direct link. In an embodiment, when blocking the network traffic at block 520, the loop prevention engine 404 may not forward that network traffic (which was received by the networking node device 400 and which entered the loop configuration at a networking node device indicated by the forwarding rule(s) 410) to a downstream networking node device. If, at decision block 515, the first networking node device determines that a forwarding rule indicates that the network traffic should not be blocked, then the method 500 proceeds to block 525 where the first networking node device forwards the network traffic received on the first direct link through the second direct link. In an embodiment, at block 525, the loop prevention engine 404 may forward the network traffic through the second direct link (e.g., in the communication system 406) to a downstream networking node device.

For example, as illustrated in FIG. 8, the network traffic 800 enters the loop configuration 300 through the networking node device 208 and may be forwarded to the networking node device 210 through the link 310, as well as to the networking node device 206 through the link 308. The networking node device 206 may then forwards the network traffic to the networking node device 204 (which may be the first networking node device discussed above) through the link 306 (which may be the first direct link discussed above.) As indicated by the "X" on the link 312, the networking node device 204 may blocks the network traffic 800 from being forwarded over the link 312 based on the forwarding rules discussed above with regard to the method 600 that instruct the networking node device 204 to block traffic that entered the loop configuration through the networking node device 208 from being forwarded on the link 312.

However, as illustrated in FIG. 7, the network traffic 700 that is received by the networking node device 204 over the link 306 may be forwarded by the networking node device 204 through the link 312 to the networking node device 208 based on the forwarding rules discussed above with regard to the method 600. However, as illustrated, the networking node device 208 will block the network traffic 700 from being forwarded over the link 310 to the networking node device 210 based on the forwarding rules discussed above with regard to the method 600, thus preventing the network traffic 700 from looping in the loop configuration 300.

Similarly, as illustrated in FIG. 9, the network traffic 900 that enters the loop configuration 300 through the networking node device 210 is forwarded by the networking node device 210 to the networking node device 208 through the link 310, and to the networking node device 204 through the link 312 (which may now be the first direct link in this example.) The networking node device 204 may then forwards the network traffic to the networking node device 206 through the link 306 (which may be the second direct link in this example according to the forward rules for networking node device 204. However, the network traffic 900 is blocked from being forwarded through the link 308 by both the networking node device 206 and the networking node device 208 based on the forwarding rules discussed above with regard to the method 600, which prevents the network traffic 900 from looping in the loop configuration 300.

Referring to FIG. 10, network traffic 1000 that enters the loop configuration 300 through the networking node device 204 will have the first networking node device identifier for the networking node device 204 added to that network traffic 1000 (e.g., by the loop prevention engine 404 in the networking node device 204) in order to indicate to the networking node devices 206-210 that the network traffic 1000 entered the loop configuration from the networking node device 204. The networking node device 204 may then forward the network traffic 1000 to the networking node device 206 through the direct link 306 (e.g., the first direct link in this example), and to the networking node device 210 through the link 312 (e.g., the second direct link in this example). However, the network traffic 1000 may be blocked from be forwarded on the link 310 by the networking node device 208 and the networking node device 210 based on the forwarding rules discussed above with regard to the method 600, which prevents the network traffic 1000 from looping in the loop configuration 300.

Therefore, as illustrated in FIGS. 7-10, in some embodiments the networking node device 204 may block network traffic 800 from being forwarded through the link 312, while the network traffic 700 and the network traffic 1000 may be forwarded through the link 312, and the network traffic 900 may be received by the networking node device 204 through the link 312. Furthermore, the network traffic 700, 900 and 1000 may be blocked at other links (e.g., the link 310 and the link 308) by the other networking node devices within the loop configuration 300 such that none of that networking traffic 700, 900, and 1000 loops in the loop configuration 300.

Thus, systems and methods have been described that provide a loop prevention system that includes a plurality of networking node devices in a loop configuration, with each networking node device configured to both block network traffic and receive and/or forward network traffic on one of its direct link to the loop configuration based on which networking node device the network traffic entered the loop configuration. The networking node devices may block traffic according to forwarding rules that may be generated by each networking node device based on shortest path trees for each of the other networking node devices in the loop configuration. The loop prevention system of the present disclosure thus operates to breaks logical loops without completely blocking any of the links that provide the loop configuration, which provides for loop prevention while utilizing all links between all networking node devices in the loop configuration, resulting in greater bandwidth than conventional loop prevention systems that operate to block all traffic on a link in the loop configuration.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A loop prevention system, comprising:
a plurality of networking node devices that are coupled together in a loop configuration, wherein the plurality of networking node devices include a first networking node device that includes a first direct link that connects the first networking node device to the loop configuration, and a second direct link that connects the first networking node device to the loop configuration, wherein the first networking node device is configured to:
receive, through the first direct link, first network traffic that entered the loop configuration at a second networking node device of the plurality of networking node devices in the loop configuration;
block the first network traffic through the second direct link based on a first forwarding rule for network traffic that enters the loop configuration at the second networking node device and that is received by the first networking node device;
receive, through the second direct link, second network traffic that entered the loop configuration at a third networking node device of the plurality of networking node devices in the loop configuration;
receive network traffic through a third direct link that does not couple the first networking node device to the loop configuration;
add a first networking node device identifier to the network traffic; and
forward the network traffic including the first networking node device identifier through the first direct link and the second direct link, wherein the network traffic that includes the first networking node device identifier is blocked through a fourth direct link between two of the plurality of networking node devices in the loop configuration based on the first networking node device identifier.

2. The loop prevention system of claim 1, wherein the first networking node device is configured to:
receive, through the first direct link, third network traffic that entered the loop configuration at a fourth networking node device of the plurality of networking node devices in the loop configuration; and
forward the third network traffic through the second direct link based on a second forwarding rule for network traffic that enters the loop configuration at the fourth networking node device and that is received by the first networking node device.

3. The loop prevention system of claim 1, wherein the first networking node device is configured to:
receive, through the first direct link, third network traffic that entered the loop configuration at a fourth networking node device of the plurality of networking node devices in the loop configuration; and
block the third network traffic from being forwarded through the second direct link based on a second forwarding rule for network traffic that enters the loop configuration at the fourth networking node device and that is received by the first networking node device.

4. The loop prevention system of claim 1, wherein the first networking node device is configured to:
generate a third shortest path tree where a root networking node device of the third shortest path tree is the first networking node device; and
provide the third shortest path tree to each of the plurality of networking node devices in the loop configuration.

5. The loop prevention system of claim 1, wherein the first networking node device is configured to:
generate a first shortest path tree where a root networking node device of the first shortest path tree is the second networking node device;
generate a second shortest path tree where the root networking node device of the second shortest path tree is the third networking node device; and
determine the first forwarding rule based on the first shortest path tree.

6. The loop prevention system of claim 5, wherein the first shortest path tree is missing the second direct link between the first networking node device and the third networking node device.

7. An information handling system (IHS), comprising:
a communication system that is coupled to a plurality of networking node devices that are coupled together in a loop configuration, wherein the communication system includes a first direct link that connects the communication system to the loop configuration, and a second direct link that connects the communication system to the loop configuration,
a processing system coupled to the communication system; and
a memory system coupled to the processing system and including instruction that, when executed by the processing system, cause the processing system to provide a loop prevention engine that is configured to:
receive, through the first direct link, first network traffic that entered the loop configuration at a first networking node device of the plurality of networking node devices in the loop configuration;
block the first network traffic through the second direct link based on a first forwarding rule for network traffic that enters the loop configuration at the first networking node device and that is received by the communication system;
receive, through the second direct link, second network traffic that entered the loop configuration at a second networking node device of the plurality of networking node devices in the loop configuration;
receive network traffic through a third direct link that does not couple the communication system to the loop configuration;
add a communication system identifier to the network traffic; and
forward the network traffic including the communication system identifier through the first direct link and the second direct link, wherein the network traffic that includes the communication system identifier is blocked through a fourth direct link between two of the plurality of networking node devices in the loop configuration based on the communication system identifier.

8. The IHS of claim 7, wherein the loop prevention engine is configured to:

generate a third shortest path tree where a root networking node device of the third shortest path tree is the IHS; and provide the third shortest path tree to each of the plurality of networking node devices in the loop configuration.

9. The IHS of claim 7, wherein the loop prevention engine is configured to:

receive, through the first direct link, third network traffic that entered the loop configuration at a third networking node device of the plurality of networking node devices in the loop configuration; and forward the third network traffic through the second direct link based on a second forwarding rule for network traffic that enters the loop configuration at the third networking node device and that is received by the communication system.

10. The IHS of claim 7, wherein the loop prevention engine is configured to:

receive, through the first direct link, third network traffic that entered the loop configuration at a third networking node device of the plurality of networking node devices in the loop configuration; and block the third network traffic from being forwarded through the second direct link based on a second forwarding rule for network traffic that enters the loop configuration at the third networking node device and that is received by the communication system.

11. The IHS of claim 7, wherein the loop prevention engine is configured to:

receive a first shortest path tree where a root networking node device of the first shortest path tree is the first networking node device;

receive a second shortest path tree where the root networking node device of the second shortest path tree is the second networking node device; and determine the first forwarding rule based on the first shortest path tree.

12. The IHS of claim 11, wherein the first shortest path tree is missing the second direct link between the communication system and the second networking node device.

13. A method for loop prevention, comprising:

receiving, by a first networking node device included in a plurality of networking node devices that are coupled together to form a loop configuration and through a first direct link that couples the first networking node device to the loop configuration, first network traffic that entered the loop configuration at a second networking node device of the plurality of networking node devices in the loop configuration;

blocking, by the first networking node device, the first network traffic through a second direct link that couples the first networking node device to the loop configuration based on a first forwarding rule for network traffic that enters the loop configuration at the second networking node device and that is received by the first networking node device;

receiving, by the first networking node device through the second direct link, second network traffic that entered the loop configuration at a third networking node device of the plurality of networking node devices in the loop configuration;

receiving, by the first networking node device, network traffic through a third direct link that does not couple the first networking node device to the loop configuration;

adding, by the first networking node device, a first networking node device identifier to the network traffic; and forwarding, by the first networking node device, the network traffic including the first networking node device identifier through the first direct link and the second direct link, wherein the network traffic that includes the first networking node device identifier is in the loop configuration based on the first networking node device identifier.

14. The method of claim 13, further comprising:

generating, by the first networking node device, a first shortest path tree where a root networking node device of the first shortest path tree is the second networking node device;

generating, by the first networking node device, a second shortest path tree where the root networking node device of the second shortest path tree is the third networking node device; and determining, by the first networking node device, the first forwarding rule based on the first shortest path tree.

15. The method of claim 14, wherein the first shortest path tree is missing the second direct link between the first networking node device and the third networking node device.

16. The method of claim 13, further comprising:

receiving, by the first networking node device through the first direct link, third network traffic that entered the loop configuration at a fourth networking node device of the plurality of networking node devices in the loop configuration; and forwarding, by the first networking node device, the third network traffic through the second direct link based on a second forwarding rule for network traffic that enters the loop configuration at the fourth networking node device and that is received by the first networking node device.

17. The method of claim 13, further comprising:

receiving, by the first networking node device through the first direct link, third network traffic that entered the loop configuration at a fourth networking node device of the plurality of networking node devices in the loop configuration; and blocking, by the first networking node device, the third network traffic from being forwarded through the second direct link based on a second forwarding rule for network traffic that enters the loop configuration at the fourth networking node device and that is received by the first networking node device.

* * * * *